May 29, 1956      G. P. FULTON      2,747,945
LUBRICATING MEANS
Filed March 4, 1954
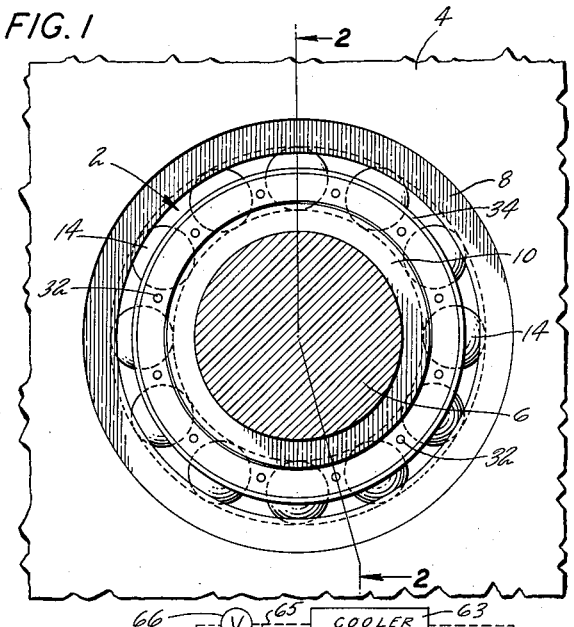
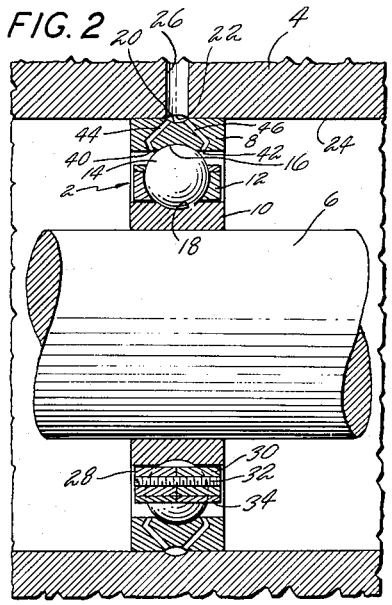
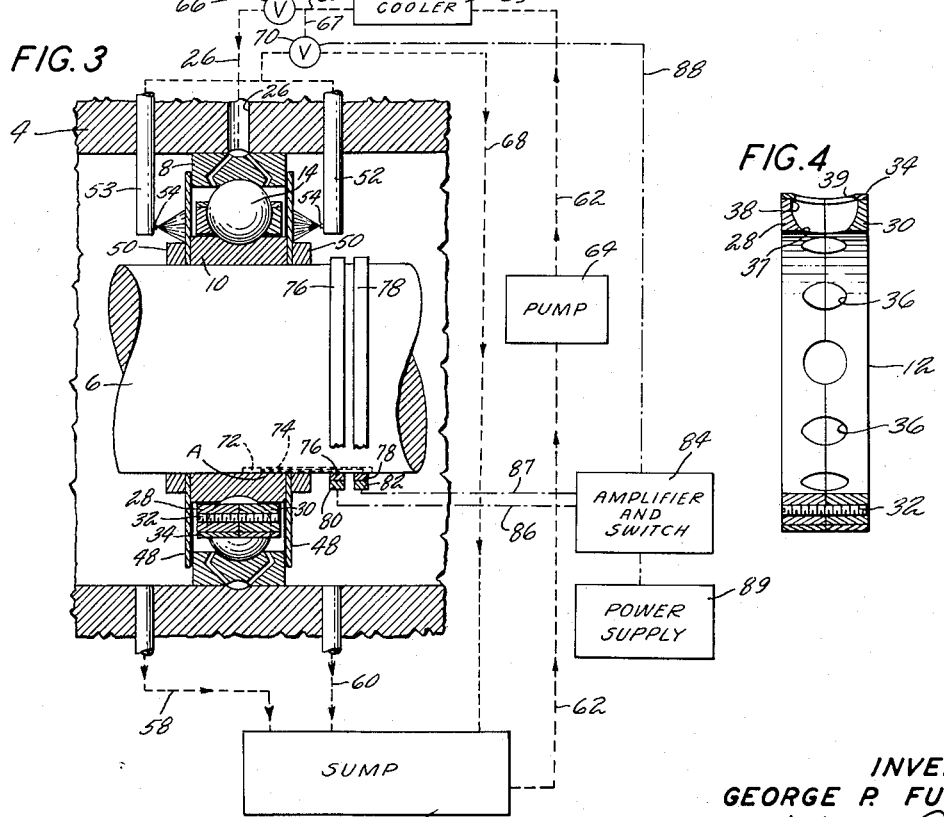
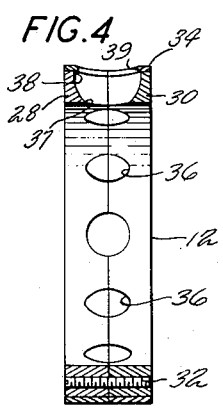
INVENTOR
GEORGE P. FULTON
BY Jack N. McCarthy
AGENT United States Patent Office 2,747,945
Patented May 29, 1956

2,747,945

LUBRICATING MEANS

George P. Fulton, Coventry, Conn., assignor to United Aircraft Corporation, East Hartford, Conn., a corporation of Delaware Application March 4, 1954, Serial No. 414,063

19 Claims. (Cl. 308—77)

This invention relates to anti-friction bearings, and refers more particularly to high speed bearings.

An object of this invention is to provide bearings with lubricant-carrying members of a wick or absorbent material.

Another object of this invention is to provide means for spraying a lubricant onto a lubricant retaining material and the elements of an anti-friction bearing which have relative movement therebetween.

A further object of this invention is to provide an auxiliary means for cooling a bearing giving it a longer useful life.

Another object of this invention is to provide means for controlling the path of departure from a bearing followed by the lubricant after being thrown from the bearing members by centrifugal force during rotation.

Other objects and advantages will be apparent from the specification and from the accompanying drawings which illustrate an embodiment of the invention.

Fig. 1 is an elevational view showing an anti-friction bearing construction.

Fig. 2 is a sectional view taken along the line of 2—2 of Fig. 1.

Fig. 3 is a view showing the oil cooling and retaining fins along with the cooling system.

Fig. 4 is a view of the retainer of the balls of the bearing.

Referring to the figures, Fig. 1 shows the bearing 2, fixed in a housing 4 supporting a shaft 6. The bearing 2 comprises four main parts: (1) the outer bearing ring 8, (2) the inner bearing ring 10, (3) the retainer 12, and (4) the balls 14.

The outer bearing ring 8 may be fixed within the housing 4 by any means desired. An annular groove 20 formed in the outer surface of the outer ring 8 is aligned with an annular groove 22 formed in the inner surface 24 of the housing. One end of a fluid passageway 26 opens into groove 22 for a purpose to be hereinafter described. The balls 14 ride in a race 16 formed in the inner surface of outer ring 8 and a race 18 formed in the outer surface of inner ring 10.

Bearing retainer 12 is shown (see Fig. 4) formed in two halves 28 and 30 which are held together by a plurality of screws 32. An annular wick 34 is fixed to the outer circumference of said retainer ring. One means of fixing the wick to the retainer ring is by bonding. The retainer ring 12 has a plurality of ball containing holes 36 therethrough, one for each ball 14. These ball containing holes 36 form in the inner and outer circumference of said retainer ring a series of apertures 37 and 38. Apertures 38 are formed around the outer circumference of said retainer ring 12. The wick 34 has a plurality of openings 39 therethrough, one for each aperture 38 on the outer circumference of said retainer ring. These openings are circular and are positioned coaxially with said apertures 38. Wick openings 39 have a smaller diameter than the apertures 38 in said retainer ring and the balls 14 at this point. As viewed in Fig. 2, this permits the ball 14 to rotate freely in its containing hole 36 while having a wiping contact with the wick 34.

Wick 34 and the elements of the anti-friction bearing which have relative movement therebetween are lubricated by a lubricant directed thereon by apertures 40 and 42 located on the inner surface of outer ring 8 adjacent race 16. These apertures are formed by the intersection of passageways 44 and 46, which pass through said outer bearing ring 8, with said inner surface. The other ends of passageways 44 and 46 open into circular groove 20 of the outer surface of said outer ring 8, which is also connected with fluid conduit 26, referred to above.

To prevent the lubricant from being thrown immediately from said bearing, thereby losing some of its lubricating and cooling effectiveness, annular fins 48 are fixed to the inner bearing ring 10. While this may be done by any means desired, Fig. 3 shows said fins held in position by annular holding members 50 fixed to supported shaft 6. Frictional contact of the outer edges of fins 48 with the sides of outer bearing ring 8 is prevented by having the inner bearing ring 10 a little wider than the outer bearing ring 8. Lubricant directed upon the wick and balls is permitted to flow through this spacing between the outer edge of each fin and outer ring 8.

To provide a cooling action in excess of normal lubricant flow through conduit 26, conduits 52 and 53 extend into the annular opening between housing 4 and shaft 6. Nozzles 54 are located on said conduits and positioned to direct a fluid onto the outer surfaces of said cooling and retaining fins 48.

The annular opening formed between housing 4 and shaft 6 is connected to a sump 56 by drain passageways 58 and 60. Sump 56 is connected to the inlet of a pump 64 by a conduit 62. The outlet of pump 64 is connected to fluid conduit 26 by an oil cooler 63, a conduit 65 and valve 66. The valve 66 is of the general throttling type extending from an "on" position to an "off" position. The outlet of pump 64 is also connected by oil cooler 63 and by conduits 65 and 67 to a two-position solenoid actuated directing valve 70. This valve 70 connects conduit 67 to either conduits 52 and 53 or to a conduit 68 which acts as a by-pass to sump 56.

The valve 70, which can be positioned to either connect conduit 67 to conduits 52 and 53 or to conduit 68, is shown (see Fig. 3) controlled by the temperature of bearing 2 at a point A. This solenoid actuated valve 70 is biased in its unenergized position to connect conduit 67 to conduit 68 thereby performing a by-pass action. Valve 70 in its energized position connects conduit 67 to conduits 52 and 53.

A temperature sensing device 72 is fixed at one end of a groove 74 cut lengthwise into shaft 6 (see Fig. 3) adjacent point A. One metal of device 72 is electrically connected to a slip ring 76 mounted on shaft 6 and passing over the other end of groove 74 and the other metal is electrically connected to another slip ring 78 mounted adjacent slip ring 76. Brush contacts 80 and 82 are positioned against slip rings 76 and 78, respectively, to conduct the electrical signal from the temperature sensing device 72 to an amplifier and switching device 84. Brush contact 80 is connected to the device 84 by an electrical transfer means 86 and brush contact 82 is connected to said device by electrical transfer means 87. The signal from the temperature sensing device is amplified in this device and, at a predetermined signal value, determined by a temperature at point A, a switch, set to be actuated at said predetermined signal, is actuated to energize control valve 70 to connect conduit 67 to conduits 52 and 53. A power supply 89 supplies the necessary power to operate the system. The solenoid of this valve remains energized as long as the temperature at a point A remains at or above the predetermined value referred to above.

Specific temperature sensing devices, amplifier and switching devices, and solenoid operated valves are well known in the art so are merely shown in diagrammatic form.

*Operation*

The lubricating system as shown in Fig. 3 operates under two sets of conditions; (1) when the temperature of the inner ring at point A is below a predetermined value and, (2) when the temperature of the inner ring at point A is at or above a predetermined value.

In the operation of the device under the first condition, lubricant from the sump 56 is removed therefrom by pump 64 and directed by valve 66 to fluid conduit 26 and by valve 70 to conduit 68. From fluid conduit 26 the lubricant passes into annular grooves 20 and 22 and is distributed to passageways 44 and 46. From these passageways 44 and 46 the lubricant is directed upon the wick and balls of the bearing by apertures 40 and 42. Fins 48 prevent the lubricant from being thrown immediately away from the bearing members. The lubricant then returns to sump 56 from the annular opening between housing 4 and shaft 6 by drain conduits 58 and 60. At the same time conduit 68 is by-passing a portion of the lubricant flow through pump 64 back into sump 56.

While the lubricating system is operating as above the temperature at point A is continually being sensed by the device 72 and a signal thereof being sent to the amplifier and switching device 84. Now, when the temperature at point A reaches a predetermined value the amplifier and switching device energizes solenoid actuated valve 70. This valve is now positioned to direct a flow of lubricant from pump 64 to conduits 52 and 53 instead of to conduit 68 as was done in the first condition. The lubricant in conduits 52 and 53 is directed upon the outer surfaces of fins 48 to provide a cooling action.

It is to be understood that in the event a particular bearing is not to be operated to exceed an operating temperature which is considered critical, the conduits 52, 53, 67 and 68, along with valve 70, may be omitted from the system. It is also apparent from the specification and drawings that other subcombinations of the system may be used without deviating from the invention.

What it is desired to obtain by Letters Patent is:

1. A bearing structure comprising a first bearing ring, a second bearing ring, said first bearing ring having a race, said second bearing ring having a race, a series of balls located in said races between said first and second bearing rings, a retainer ring, said retainer ring being located between said first and second bearing rings and having an opening for each ball, a wick fixed to one surface of said retainer ring, said wick having an opening for each ball, each opening in said retainer ring forming in an external surface of said retainer ring an aperture, each opening for a ball on said wick being in correspondence with an aperture on the external surface of said retainer ring, said wick openings being smaller than the apertures in said retainer ring.

2. A bearing structure comprising an outer bearing ring, an inner bearing ring, said outer bearing ring having a race on its inner circumference, said inner bearing ring having a race on its outer circumference, a series of balls located in said races between said inner and outer bearing rings, a retainer ring, said retainer ring being located between said inner and outer bearing rings and having an opening for each ball, a wick fixed to the outer circumference of said retainer ring, said wick having an opening for each ball, each opening in said retainer ring forming in the outer circumference of said retainer ring an aperture, each opening for a ball on said wick being in correspondence with an aperture on the outer circumference of said retainer ring, said wick openings being smaller than the apertures in said retainer ring.

3. A high speed bearing comprising, an outer bearing ring, an inner bearing ring, said rings having races, a series of balls located in said races, a retainer ring, said retainer ring being located between said inner and outer bearing rings and having an opening for each ball, a wick fixed to the outer periphery of said retainer ring, said wick having an opening for each ball, each opening in said retainer ring forming in an external surface of said retainer ring an aperture, each opening for a ball on said wick being in correspondence with an aperture on the external surface of said retainer ring, said wick openings being smaller than the apertures in said retainer ring, said outer bearing ring having an opening in its inner surface for directing a fluid supply onto said wick.

4. A high speed bearing comprising, an outer bearing ring, an inner bearing ring, said rings having races, a series of balls located in said races, a retainer ring, said retainer ring being located between said inner and outer bearing rings and having an opening for each ball, a wick fixed to the outer periphery of said retainer ring, said wick having an opening for each ball, each opening in said retainer ring forming in an external surface of said retainer ring an aperture, each opening for a ball on said wick being in correspondence with an aperture on the external surface of said retainer ring, said wick openings being smaller than the apertures in said retainer ring, means for directing a fluid supply onto said wick.

5. A high speed bearing system comprising, a housing, an outer bearing ring fixed to said housing, an inner bearing ring, said rings having races, a series of balls located in said races, a retainer ring, said retainer ring being located between said inner and outer bearing rings and having an opening for each ball, a wick fixed to the outer periphery of said retainer ring, said wick having an opening for each ball, each opening in said retainer ring forming in an external surface of said retainer ring an aperture, each opening for a ball on said wick being in correspondence with an aperture on the external surface of said retainer ring, said wick openings being smaller than the apertures in said retainer ring, said outer bearing ring having an annulus around its outer periphery, said outer bearing ring having a first passageway connecting said annulus to its inner surface, a pump, a second passageway connecting the outlet of said pump to said annulus, a fluid supply, a third passageway connecting the inlet of said pump to said fluid supply.

6. A bearing structure comprising a first bearing ring, a second bearing ring, said first bearing ring having a race, said second bearing ring having a race, a series of balls located in said races between said first and second bearing rings, a retainer ring, said retainer ring being located between said first and second bearing rings and having an opening for each ball, a wick fixed to one surface of said retainer ring, said wick having an opening for each ball, each opening in said retainer ring forming in an external surface of said retainer ring an aperture, each opening for a ball on said wick being in correspondence with an aperture on the external surface of said retainer ring, said wick openings being smaller than the apertures in said retainer ring, an annular fin fixed to said first bearing ring and extending towards the second bearing ring.

7. A bearing structure comprising a first bearing ring, a second bearing ring, said first bearing ring having a race, said second bearing ring having a race, a series of balls located in said races between said first and second bearing ring, a retainer ring, said retainer ring being located between said first and second bearing rings and having an opening for each ball, a wick fixed to one surface of said retainer ring, said wick having an opening for each ball, each opening in said retainer ring forming in an external surface of said retainer ring an aperture, each opening for a ball on said wick being in correspondence with an aperture on the external surface of said retainer ring, said wick openings being smaller than the apertures in said retainer ring, an annular fin fixed at its inner edge to one side of said first bearing ring and extending towards the second bearing ring, a second annular fin fixed at its inner edge of the other side of said first bearing ring and extending towards the second bearing ring.

8. A high speed bearing system comprising, a housing, an outer bearing ring fixed to said housing, an inner bearing ring, a shaft supported in said inner bearing ring, said rings having races, a series of balls located in said races, a retainer ring, said retainer ring being located between said inner and outer bearing rings and having an opening for each ball, a wick fixed to the outer periphery of said retainer ring, said wick having an opening for each ball, each opening in said retainer ring forming in an external surface of said retainer ring an aperture, each opening for a ball on said wick being in correspondence with an aperture on the external surface of said retainer ring, said wick openings being smaller than the apertures in said retainer ring, said outer bearing ring having an opening in its inner surface for directing a fluid supply onto said wick, an annular fin fixed to the inner bearing ring and extending towards said outer bearing ring, a fluid supply, means for directing said fluid supply onto said fin.

9. A high speed bearing system comprising, a housing, an outer bearing ring fixed to said housing, an inner bearing ring, a shaft supported in said inner bearing ring, said rings having races, a series of balls located in said races, a retainer ring, said retainer ring being located between said inner and outer bearing rings and having an opening for each ball, a wick fixed to the outer periphery of said retainer ring, said wick having an opening for each ball, each opening in said retainer ring forming in an external surface of said retainer ring an aperture, each opening for a ball on said wick being in correspondence with an aperture on the external surface of said retainer ring, said wick openings being smaller than the apertures in said retainer ring, said outer bearing ring having an opening in its inner surface for directing a fluid supply onto said wick, an annular fin fixed to the inner bearing ring and extending towards said outer bearing ring, means for directing a fluid supply onto said fin when the temperature in said bearing reaches a predetermined value.

10. A high speed bearing system comprising, a housing, an outer bearing ring fixed to said housing, an inner bearing ring, a shaft supported in said inner bearing ring, said rings having races, a series of balls located in said races, a retainer ring, said retainer ring being located between said inner and outer bearing rings and having an opening for each ball, a wick fixed to the outer periphery of said retainer ring, said wick having an opening for each ball, each opening in said retainer ring forming in an external surface of said retainer ring an aperture, each opening for a ball on said wick being in correspondence with an aperture on the external surface of said retainer ring, said wick openings being smaller than the apertures in said retainer ring, said outer bearing ring having an opening in its inner surface for directing a fluid supply onto said wick, an annular fin fixed to the inner bearing ring and extending towards said outer bearing ring, said shaft having a groove in the surface thereof extending partially under said inner bearing ring, a temperature sensing element located in said groove under said inner bearing ring, means actuated by said temperature sensing element for directing a fluid supply onto said fin.

11. A high speed bearing system comprising, a housing, an outer bearing ring fixed to said housing, an inner bearing ring, said rings having races, a series of balls located in said races, a retainer ring, said retainer ring being located between said inner and outer bearing rings and having an opening for each ball, a wick fixed to the outer periphery of said retainer ring, said wick having an opening for each ball, each opening in said retainer ring forming in an external surface of said retainer ring an aperture, each opening for a ball on said wick being in correspondence with an aperture on the external surface of said retainer ring, said wick openings being smaller than the apertures in said retainer ring, means for directing a fluid supply onto said wick, a fin extending from said inner bearing ring towards said outer bearing ring, means for directing a fluid supply onto said fin.

12. A high speed bearing system comprising, a housing, an outer bearing ring fixed to said housing, an inner bearing ring, said rings having races, a series of balls located in said races, a retainer ring, said retainer ring being located between said inner and outer bearing rings and having an opening for each ball, a wick fixed to the outer periphery of said retainer ring, said wick having an opening for each ball, each opening in said retainer ring forming in an external surface of said retainer ring an aperture, each opening for a ball on said wick being in correspondence with an aperture on the external surface of said retainer ring, said wick openings being smaller than the apertures in said retainer ring, means for directing a fluid supply onto said wick, a fin extending from said inner bearing ring towards said outer bearing ring, means responsive to bearing temperature for directing a fluid supply onto said fin.

13. A high speed bearing system comprising, a housing, an outer bearing ring fixed to said housing, an inner bearing ring, a shaft supported in said inner bearing ring, said rings having races, a series of balls located in said races, a retainer ring, said retainer ring being located between said inner and outer bearing rings and having an opening for each ball, a wick fixed to the outer periphery of said retainer ring, said wick having an opening for each ball, each opening in said retainer ring forming in an external surface of said retainer ring an aperture, each opening for a ball on said wick being in correspondence with an aperture on the external surface of said retainer ring, said wick openings being smaller than the apertures in said retainer ring, said outer bearing ring having an annulus around its outer periphery, said outer bearing ring having a first passageway connecting said annulus to its inner surface, a pump, a second passageway connecting the outlet of said pump to said annulus, a fluid supply, a third passageway connecting the inlet of said pump to said fluid supply, an annular fin fixed to the inner bearing ring and extending towards said outer bearing ring, said shaft having an axially extending groove in the surface thereof extending partially under said inner bearing ring, a temperature sensing element located in said groove under said inner bearing ring, means actuated by said temperature sensing element for directing a fluid supply onto said fin.

14. A retainer ring for anti-friction bearings, said retainer ring adapted to be located between inner and outer bearing rings and having openings therein adapted to receive balls, a wick fixed to the outer circumference of said retainer ring, said wick having openings therein adapted to receive balls, each opening in said retainer ring forming in the outer circumference of said retainer ring an aperture, each opening for a ball on said wick being in correspondence with an aperture on the outer circumference of said retainer ring, said wick openings being smaller than the apertures in said retainer ring.

15. A high speed bearing system comprising, a housing, an outer bearing ring fixed to said housing, an inner bearing ring, said rings having races, a series of balls located in said races, a retainer ring, said retainer ring being located between said inner and outer bearing rings and having an opening for each ball, a wick fixed to the outer periphery of said retainer ring, said wick having an opening for each ball, each opening in said retainer ring forming in an external surface of said retainer ring an aperture, each opening for a ball on said wick being in correspondence with an aperture on the external surface of said retainer ring, said wick openings being smaller than the apertures in said retainer ring, said outer bearing ring having an annulus around its outer periphery, said outer bearing ring having a first passageway connecting said annulus to its inner surface, a pump, a second passageway connecting the outlet of said pump to said annulus, a fluid supply, a third passageway connecting the inlet of said pump to said fluid supply, and a fluid cooler located in said second passageway between said pump and said annulus.

16. A high speed bearing system comprising, a housing, an outer bearing ring fixed to said housing, an inner bearing ring, a shaft supported in said inner bearing ring, said rings having races, a series of balls located in said races, a retainer ring, said retainer ring being located between said inner and outer bearing rings and having an opening for each ball, a wick fixed to the outer periphery of said retainer ring, said wick having an opening for each ball, each opening in said retainer ring forming in an external surface of said retainer ring an aperture, each opening for a ball on said wick being in correspondence with an aperture on the external surface of said retainer ring, said wick openings being smaller than the apertures in said retainer ring, said outer bearing ring having an opening in its inner surface for directing a fluid supply onto said wick, an annular fin fixed to the inner bearing ring and extending towards said outer bearing ring, a fluid supply, means for directing said fluid supply onto said fin and means for cooling said fluid supply.

17. A high speed bearing system comprising, a housing, an outer bearing ring fixed to said housing, an inner bearing ring, said rings having races, a series of balls located in said races, a retainer ring, said retainer ring being located between said inner and outer bearing rings and having an opening for each ball, an annular fin fixed to the inner bearing ring and extending towards said outer bearing ring, a fluid supply means for directing said fluid supply onto said fin.

18. A high speed bearing system comprising, a housing, an outer bearing ring fixed to said housing, an inner bearing ring, said rings having races, a series of balls located in said races, a retainer ring, said retainer ring being located between said inner and outer bearing rings and having an opening for each ball, an annular fin fixed to the inner bearing ring and extending towards said outer bearing ring, a fluid supply, means for directing a fluid supply onto said fin when the temperature in said bearing reaches a predetermined value.

19. A high speed bearing comprising, an outer bearing ring, an inner bearing ring, said rings having races, a series of balls located in said races, a retainer ring, said retainer ring being located between said inner and outer bearing rings and having an opening for each ball, a wick fixed to the outer periphery of said retainer ring, said wick having an opening for each ball, each opening in said retainer ring forming in an external surface of said retainer ring an aperture, each opening for a ball on said wick being in correspondence with an aperture on the external surface of said retainer ring, said wick openings being smaller than the apertures in said retainer ring, means for directing a fluid supply onto said wick, means for preventing the fluid from being immediately thrown away from the bearing members.

References Cited in the file of this patent
UNITED STATES PATENTS

| | | |
|---|---|---|
| 1,218,605 | Seubert | Mar. 6, 1917 |
| 1,455,981 | Zupnik | May 22, 1923 |
| 2,018,701 | Bott | Oct. 29, 1935 |
| 2,380,971 | Knox | Aug. 7, 1945 |